(12) United States Patent
Litman et al.

(10) Patent No.: US 11,308,354 B1
(45) Date of Patent: Apr. 19, 2022

(54) RESIDUAL CONTEXT REFINEMENT NETWORK ARCHITECTURE FOR OPTICAL CHARACTER RECOGNITION

(71) Applicant: Amazon Technologies, Inc., Seattle, WA (US)

(72) Inventors: Ron Litman, Tel-Aviv (IL); Oron Anschel, Haifa (IL); Shahar Tsiper, Haifa (IL); Roee Litman, Petach-Tikva (IL); Shai Mazor, Binyamina (IL); Jonathan Wu, Seattle, WA (US); Raghavan Manmatha, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 75 days.

(21) Appl. No.: 16/834,997

(22) Filed: Mar. 30, 2020

(51) Int. Cl.
  *G06K 9/62* (2006.01)
  *G06K 9/42* (2006.01)

(52) U.S. Cl.
  CPC ............. *G06K 9/6256* (2013.01); *G06K 9/42* (2013.01); *G06K 9/6228* (2013.01); *G06K 9/6261* (2013.01); *G06K 9/6267* (2013.01); *G06K 2209/01* (2013.01)

(58) Field of Classification Search
  CPC ...... G06K 9/6256; G06K 9/42; G06K 9/6228; G06K 9/6261; G06K 9/6267; G06K 2209/01
  See application file for complete search history.

(56) References Cited

PUBLICATIONS

Shi, Baoguang, et al. "Robust scene text recognition with automatic rectification." Proceedings of the IEEE conference on computer vision and pattern recognition. 2016. (Year: 2016).*

Baek, Jeonghun, et al. "What is wrong with scene text recognition model comparisons? dataset and model analysis." Proceedings of the IEEE/CVF International Conference on Computer Vision. 2019. (Year: 2019).*

* cited by examiner

*Primary Examiner* — Utpal D Shah
(74) *Attorney, Agent, or Firm* — Nicholson De Vos Webster & Elliott LLP

(57) ABSTRACT

Techniques for recognizing text in an image are described. An exemplary method may include receiving a request to recognize text in an image; extracting features from the image and generating a visual feature sequence from the extracted features; performing selective contextual refinement at least one selective contextual refinement block of a stack of selective contextual refinement blocks to generate a text prediction by: generating a contextual feature map and combining the contextual feature map with the visual feature sequence into a visual feature space, and applying a selective decoder that utilizes a two-step attention on the visual feature space to generate a text prediction, wherein the two-step attention includes performing a 1-D self-attention computation to generate attentional features and decoding the attentional features to generate the text prediction; and outputting the generated text prediction.

20 Claims, 11 Drawing Sheets

RESIDUAL CONTEXT REFINEMENT NETWORK ARCHITECTURE FOR OPTICAL CHARACTER RECOGNITION

BACKGROUND

Scene Text Recognition (STR), the task of recognizing text against complex image backgrounds is an active area of research. Applications for STR include, for example, recognizing street signs in autonomous driving, company logos, assistive technology for the blind and translation apps in mixed reality. STR in natural scenes is characterized by a large variety and complexity of backgrounds, and arbitrary imaging conditions including difficult scenarios, such as low contrast, blur, distortion, low resolution, and uneven illumination. In addition, text recognition tasks present an inherent challenge due to hard to read font types and sizes. Generally, STR may be divided into two main tasks text detection and text recognition. Text detection is the task of identifying the text regions within a natural image that may contain arbitrary shapes of text within it. Text recognition deals with the task of decoding a cropped image that contains one or more words into a digital string of its contents.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for text image recognition. According to some embodiments, a stacked block architecture is used to determine text from an image wherein the stacked block architecture utilizes a two-step attention mechanism.

Despite the great success of STR, current state-of-the-art STR have difficulty in recognizing text written in arbitrary shapes. Detailed herein is a novel STR architecture that uses a stacked block architecture with intermediate supervision during training. This allows for stable training resulting in the ability to successfully train a deep encoder (e.g., a BiLSTM encoder) to encode long-range contextual dependencies.

Figure 1:
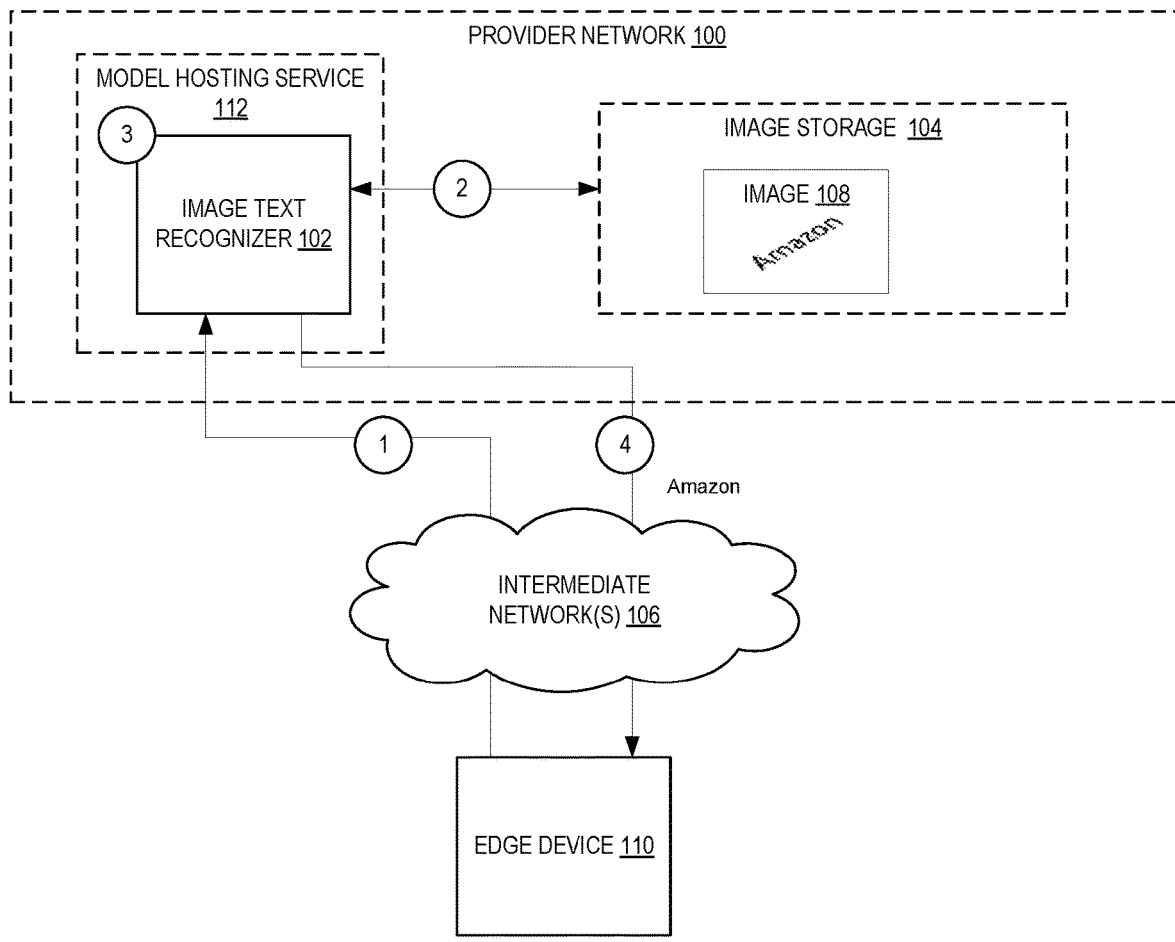
FIG. 1 illustrates a system that allows for recognizing text in an image according to some embodiments.

FIG. 1 illustrates a system that allows for recognizing text in an image according to some embodiments. In particular, an image text recognizer 102, as noted above, uses a stacked block architecture (detailed below) to determine text from an image. During training of the image text recognizer 102 intermediate supervision in intermediate blocks is used in training and a novel selective-decoder is used in inference. Typically, as more blocks are added to the stack the performance of the image text recognizer 102 improves. By training with additional blocks there is usually an increase in performance.

The selective-decoder is provided with features from different layers of the network, namely, visual features and contextual features (i.e., after sequential modeling by a BiLSTM layer), while using a two-step attention mechanism. The selective attention decoder decodes both visual and contextual features by employing a two-step attention mechanism. The first step of the attention computation figures out which visual and contextual features to attend to. In particular, the first step of attention learns to re-weight between visual features from a neural network (e.g., a convolutional neural network (CNN)) and contextual features from the encoder. The second step views the features as a sequence and attends the intercharacter relations between the characters in the sequence.

In some embodiments, the image text recognizer 102 may be a part of a service offering of a provider network 100. For example, the image text recognizer 102 may be hosted by a model hosting service 112 that allows for a plurality of tenants to host their own models or may be a service in itself offered by the provider network 100. In other embodiments, the image text recognizer 102 is program or program module to call.

In some embodiments, one or more images to analyze are stored in image storage 104. A request to analyze the one or more stored images may include a location in storage 104 of the one or more images. In other embodiments, one or more images to analyze are provided by an edge device 110 (e.g., as a part of a user request).

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code typically without the user having any control of or knowledge of the underlying compute instance(s) involved.

For example, in various embodiments, a "serverless" function may include code provided by a user or other entity—such as the provider network itself—that can be executed on demand. Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

In this illustration, circles with numbers inside indicate an exemplary flow for inference using the image text recognizer 102. At circle 1, the edge device 110 makes a request for the image text recognizer 102 to recognize text in an image.

The image text recognizer 102 then, according to the request, retrieves the image 108 from image storage 104 at circle 2. In some instances, the image is cropped so that the text portion is emphasized.

The image text recognizer 102 then perform text recognition at circle 3 and supplies the result of that recognition to the edge device 110 at circle 4. In this example, the image included the text Amazon.

Figure 2:
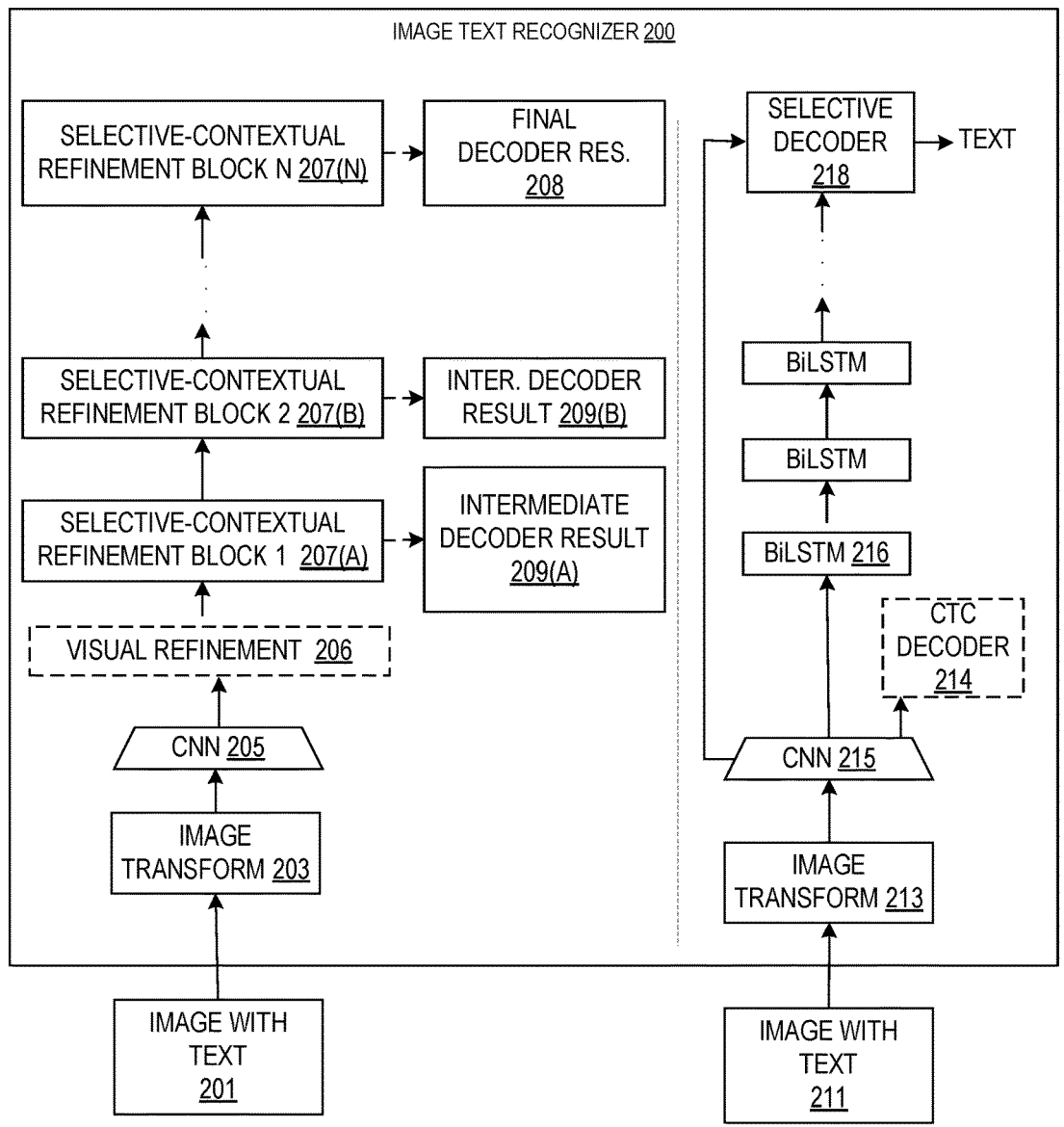
FIG. 2 illustrates an image text recognizer according to some embodiments.

FIG. 2 illustrates an image text recognizer according to some embodiments. In some embodiments, the image text recognizer 200 is image text recognizer 102 of FIG. 1. This illustration shows the image text recognizer 200 as constructed for inference and for training.

As shown, image text recognizer 200 is a stack of different blocks. The training side is on the left and inference on the right. An image transformation module 203 normalizes the input text image 201. In some embodiments, a Spatial Transformer Network (STN) is used for this normalization.

The transformation stage takes as input the cropped text image X and transforms it into a normalized image $X^I$. In some embodiments, a Thin Plate Spline (TPS) transformation is used. TPS employs a smooth spline interpolation between a set of fiducial points. Specifically, TPS finds a pre-defined number of fiducial points at the top and bottom of the text region and normalizes the predicted region to a predefined size.

A CNN 205 extracts features from the normalized input text image to map the input image to a feature map representation while using a text attention module. Specifically, the feature encoder gets an input image $X^I$ and outputs a feature map $F=[f_1, f_2, \ldots f_N]$. After extracting the feature map, a text attention module is used to convert the feature map into a visual feature sequence of length N, denoted as $V=[v_1, v_2, \ldots, v_N]$.

In some embodiments, a visual refinement is performed on the visual feature sequence using a visual refinement block 206. This block 206 refines a representation of each feature by classifying each of them to predict individual symbols. This intermediate supervision is aimed at refining the embedding (representations) of the individual characters in V. In some embodiments, the refinement is done using Connectionist Temporal Classification (CTC) based decoding. V is fed through a fully connected layer (e.g., independent and identically distributed (IID) classifiers) that outputs a sequence H of length N. The output sequence is fed into a CTC decoder to generate a final output. The CTC decoder transforms the output sequence tensor into a conditional probability distribution over label sequences and then selects the most probable label.

Figure 3:
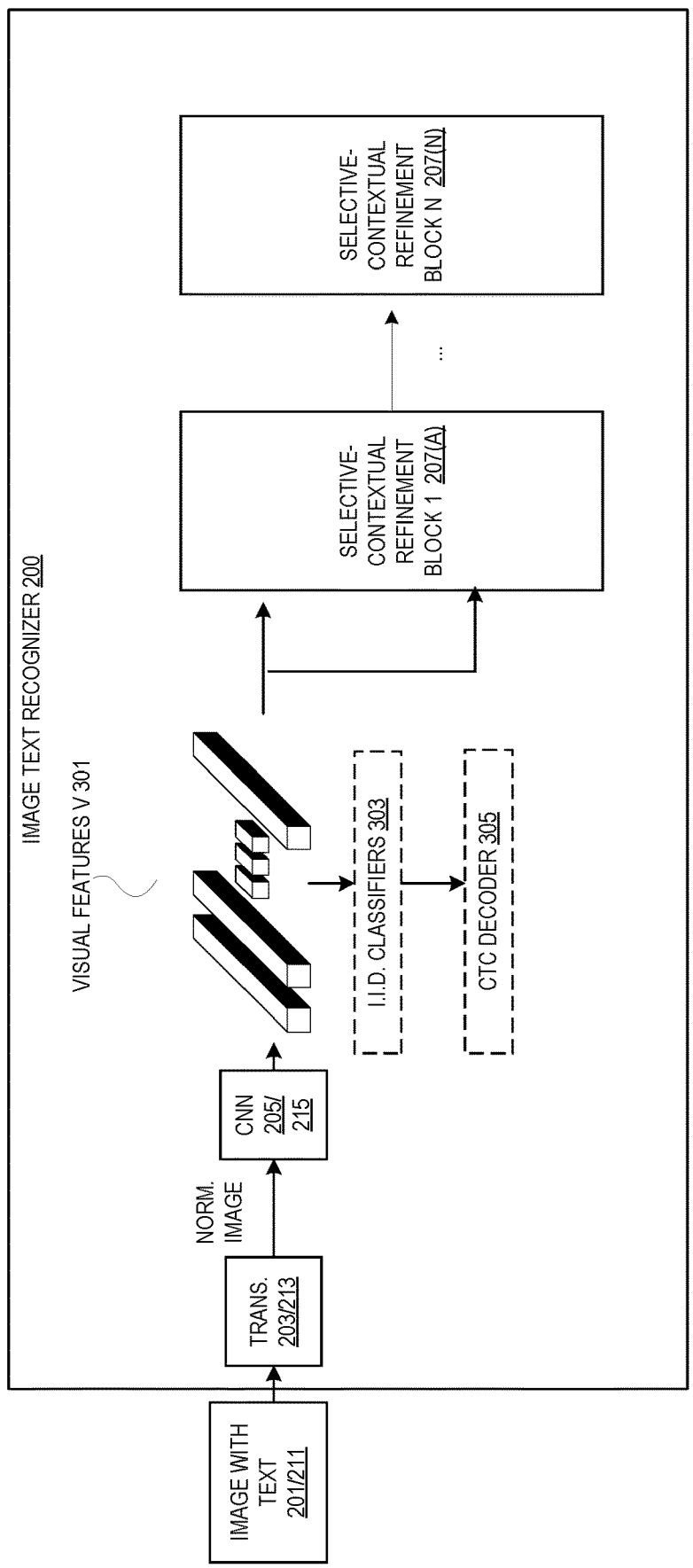
FIG. 3 illustrates embodiments of an image text recognizer.

FIG. 3 illustrates embodiments of an image text recognizer such as image text recognizer 200 including a visual refinement block. This illustration shows FIG. 2 in a different manner. In particular, the visual features map V 301 output from the CNN 205/215 is shown along with the IID classifiers 303 and CTC decoder 305 of the refinement block 206/214. The functionality of those components is detailed herein.

Figure 4:
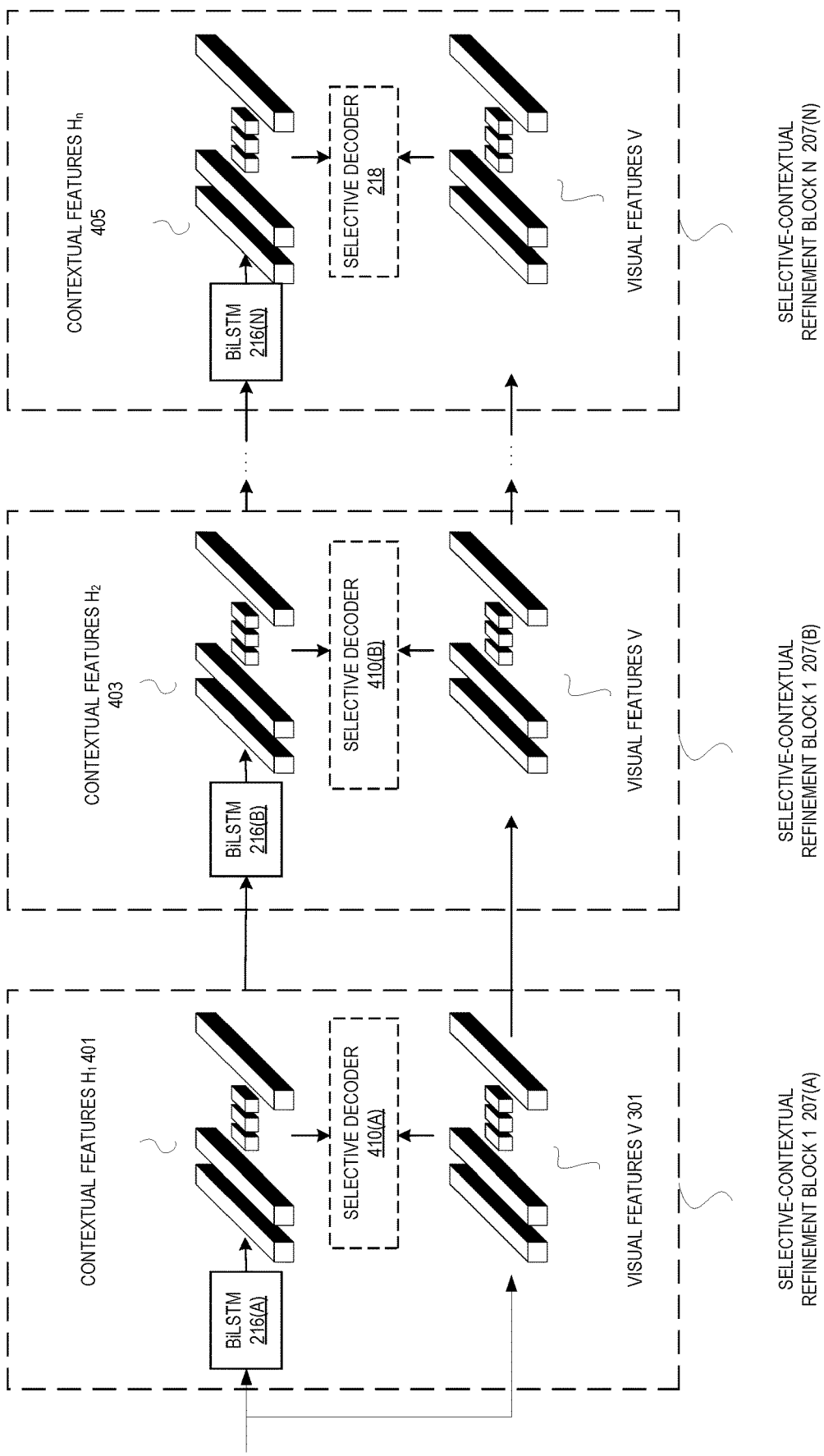
FIG. 4 illustrates embodiments of selective-contextual refinement blocks.

Following the CNN 205 (and visual refinement block 206 when present) in the stack are multiple selective-contextual refinement blocks 207(A)-207(N). Detailed illustrations embodiments of these blocks are shown in FIG. 4. The features extracted by the CNN 205 are limited by their receptive fields and may suffer due to the lack of contextual information. To counter this drawback, the two-layer BiLSTM network is applied over the feature map V, outputting H=[$h_1$, $h_2$, . . . , $h_n$]. As such, there are two feature maps available for selective decoding V and H. V is a feature map which encodes local information and H may contain contextual information as well. Both maps are concatenated into a new feature space D=(V, H), that is used both for selective decoding and as an input to the next selective-contextual refinement block.

Figure 5:
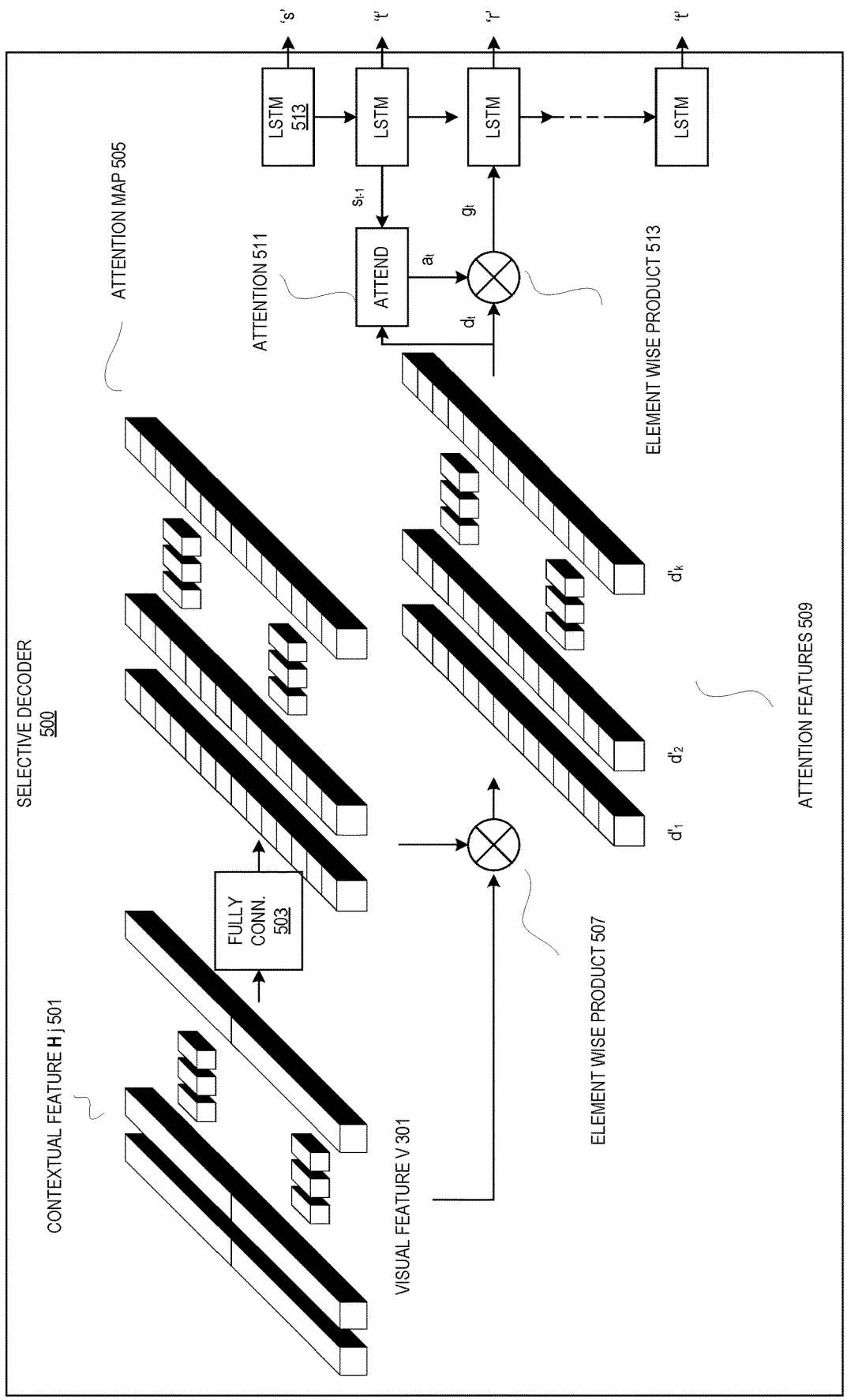
FIG. 5 illustrates embodiments of a selective decoder.

The contextual features are concatenated with the visual features from the CNN 205. This concatenated feature map is then fed into a selective-decoder, which employs a 2-step attention mechanism as illustrated in FIG. 5.

From the first block onwards the input to the next block is $D_j$=(V, $H_j$) where the index j indicates the output of the jth block. Note that the local information feature map V remains fixed throughout subsequent blocks. The j+1 block uses only $H_j$ as input to a two-layer BiLSTM yielding such that $D_{j+1}$=(V, $H_{j+1}$). These blocks may be employed as many times as needed and the final prediction is done using the decoder from the last block.

Each of the selective-contextual refinement blocks 207 (A)-207(N) includes a selective decoder that employs a two-step attention mechanism which well be detailed below with respect to FIG. 5. During training, the selective-contextual refinement blocks 207(A)-207(N) utilize both maps to train their respective decoders, the output of which is shown as intermediate decoder results 209(A) and 209(B) and the final decoder result 208. Note that the selective decoders are connected to a training loss function which sums the loss function of the CTC block and the losses from all of the selective-contextual refinement blocks.

During inference, the stack is simplified. The image transformation 213 and CNN 215 are the same as the image transformation 203 and CNN 205 used during training.

Following the output of the CNN 215 (or visual refinement block 214) are a plurality of BiLSTMs 216 in some embodiments. These are the BiLSTMs from the selective-contextual refinement blocks 207(A)-207(N). In some embodiments, the selective decoder 218 is the decoder from the final selective-contextual refinement blocks 207(N). Note that a decoder from any of the BiLSTM blocks may be used as the "final" selective decoder that generates an output. A bypass from the CNN 215 to this selective decoder 218 indicates a skip used to take V directly to the selective decoder 218. The above described forward pass results in $D_{j-1}$=(V, $H_{j-1}$), where $D_{j-1}$ is the input for the final block that is used for the output prediction. In some embodiments, the output of the CNN 215 is fed to a CTC decoder 214 to generate the "final" result without using the BiLSTM stack.

FIG. 4 illustrates embodiments of selective-contextual refinement blocks such as selective-contextual refinement blocks 207(A)-207(N). As shown, in the initial selective-contextual refinement block 207(A), visual features V 301 are received as an input. A BiLSTM 216(A) outputs contextual features $H_1$ 401 from the visual features V 301. During training, a selective decoder 410(A) is implemented to generate an intermediate decoding based on the visual features V 301 and generated contextual features $H_1$ 401.

In the subsequent selective-contextual refinement block 207(B), the contextual features $H_1$ 401 from the previous selective-contextual refinement block 207(A) are received along with the visual features V 301. The BiLSTM 216(B) outputs contextual features $H_2$ 403 from the contextual features $H_1$ 401. During training, a selective decoder 410(B) is implemented to generate an intermediate decoding based on the visual features V 301 and generated contextual features $H_2$ 403.

In the final selective-contextual refinement block 207(N), the contextual features $H_2$ 403 from the previous selective-contextual refinement block 207(B) are received along with the visual features V 301. The BiLSTM 216(N) outputs contextual features $H_N$ 405 from the contextual features $H_3$ 403. The selective decoder 218 generates a final result based on the visual features V 301 and generated contextual features $H_N$ 405. Note during inference, depending on the implementation, the intermediate selective decoders 410(A) and 410(B) are not used. However, any of the selective decoders could be used.

FIG. 5 illustrates embodiments of a selective decoder. In this illustration, the first half of the decoder 500 is a 1-D self-attention computation operating on the visual feature space D (contextual features H 501 and visual features V 301). A fully connected layer 503 obtains an attention map 505 from D. An element-wise product 507 is performed on the attention map and D, yielding the attentional features D' 509.

The decoding of D' 509 (the second half of the decoder) is done with a separate attention-decoder, such that for each t-time-step the decoder outputs $y_t$. Decoding starts by computing the vector of attentional weights using attention 511, $\alpha_t \in R^n$:

$$e_{t,i} = w^T \tanh(W_{s_{t-1}} + V d'_i + b)$$

$$\alpha_{t,i} = \exp(e_{t,i}) \bigg/ \sum_{i*=1}^{n} (e_{t,i*}),$$

where w, W, V are trainable parameters.

The decoder, using element wise product 513, linearly combines the columns of D into a vector G, which is called a glimpse:

$$g_t = \sum_{i=1}^{n} (\alpha_{t,i} d'_i).$$

Then a recurrent cell (LSTMs 513) of the decoder is fed by:

$$(x_t, s_t) = RNN(s_{t-1}, (g_t, f(y_{t-1}))),$$

where ($g_t$, $f(y_{t-1})$) denotes the concatenation between $g_t$ and the one-hot embedding of $y_{t-1}$.

The probability for a given character $p(y_t)$ can now be recovered by:

$$p(y_t) = \text{softmax}(W_0 x_t + b_0).$$

The loss for the jth block is negative log-likelihood, denoted as $L_{Attn,j}$.

Figure 6:
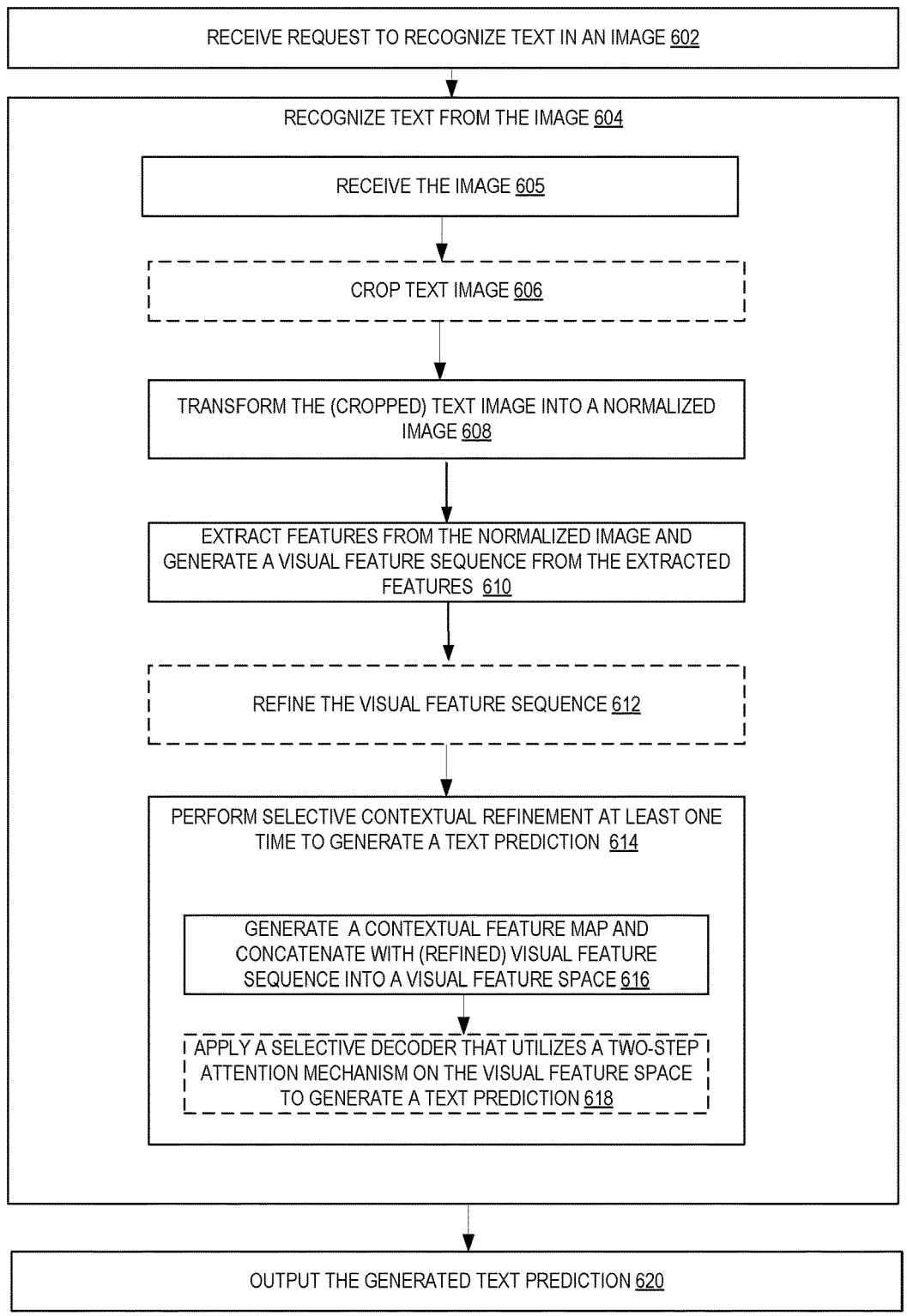
FIG. 6 is a flow diagram illustrating operations of a method for recognizing text in an image according to some embodiments.

FIG. 6 is a flow diagram illustrating operations of a method for recognizing text in an image according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the image text recognizer 200 of the other figures.

At 602, a request to recognize text in an image is received. This request may be a call to a function in a program, a call to a service of a service provider, or a call to a hosted image text recognizer. Depending the type of request, the request may include an image to analyze, a proper subset (crop) of an image to analyze, a location of an image to analyze, a location of a proper subset (crop) of an image to analyze, an indication of how results are to be provided, etc.

Text from the image is recognized at 604. This recognition may include several actions. At 608, the image is received. In some embodiments, the image is cropped to focus on the text image portion of the image at 606. Depending on the implementation, a machine learning model may be used to do this cropping.

At 608, the (cropped) image is transformed into a normalized image. Details of how this transformation may occur have been detailed above.

Features are extracted from the normalized image and a visual feature sequence is generated from the extracted features at 610. In some embodiments, a CNN performs this extraction and generation.

In some embodiments, the visual feature sequence is refined at 612. Refinement details are discussed above.

Selective contextual refinement is performed on the (refined) visual feature sequence using one or more selective-contextual refinement blocks to generate a text prediction at 614. As detailed above, there may be one or more selective-contextual refinement blocks in the image text recognizer. Typically, more blocks equate to a better result. As a part of the selective contextual refinement, a contextual feature map is generated and concatenated into a visual feature space with the (refined) visual feature sequence at 616. For example, contextual features are generated by a BiLSTM and then concatenated with the (refined) visual feature sequence.

A two-step attention mechanism on the visual feature space is performed in a selective decoder to generate a text prediction at 618. Note that final selective decoder may be from an intermediate selective contextual refinement blocks in a stack selective contextual refinement blocks.

The generated text prediction is output at 620.

Figure 7:
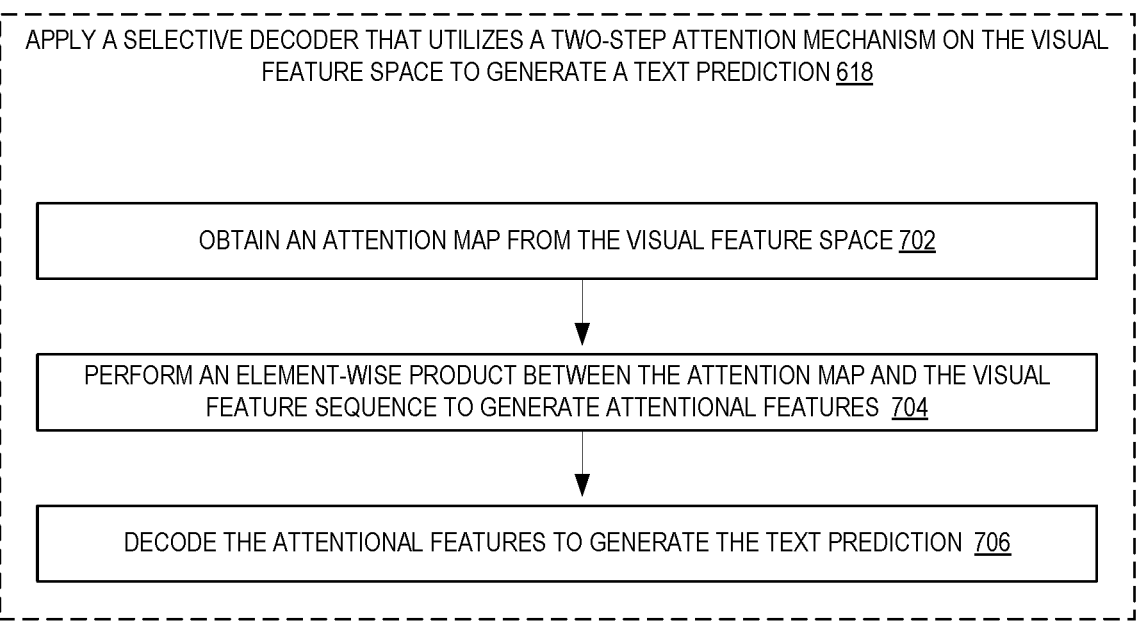
FIG. 7 is a flow diagram illustrating operations of a method for applying a selective decoder that utilizes a two-step attention mechanism on a visual feature space to generate a text prediction according to some embodiments.

FIG. 7 is a flow diagram illustrating operations of a method for applying a selective decoder that utilizes a two-step attention mechanism on a visual feature space to generate a text prediction according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the image text recognizer 200 of the other figures.

As shown, this flow details embodiments of applying a selective decoder that utilizes a two-step attention mechanism on the visual feature space to generate a text prediction 618.

A 1-D self-attention is performed first. At 702, an attention map is obtained from the visual feature space. As discussed above, a fully-connected network may be used to obtain this attention map. An element-wise product is performed on the visual feature sequence V and the attention map to generate attentional features at 704.

After the 1-D self-attention, the attentional features are decoded to generate the text prediction at 706. Specifics of some embodiments of this decoding are detailed in FIG. 5 and its associated text.

Figure 8:
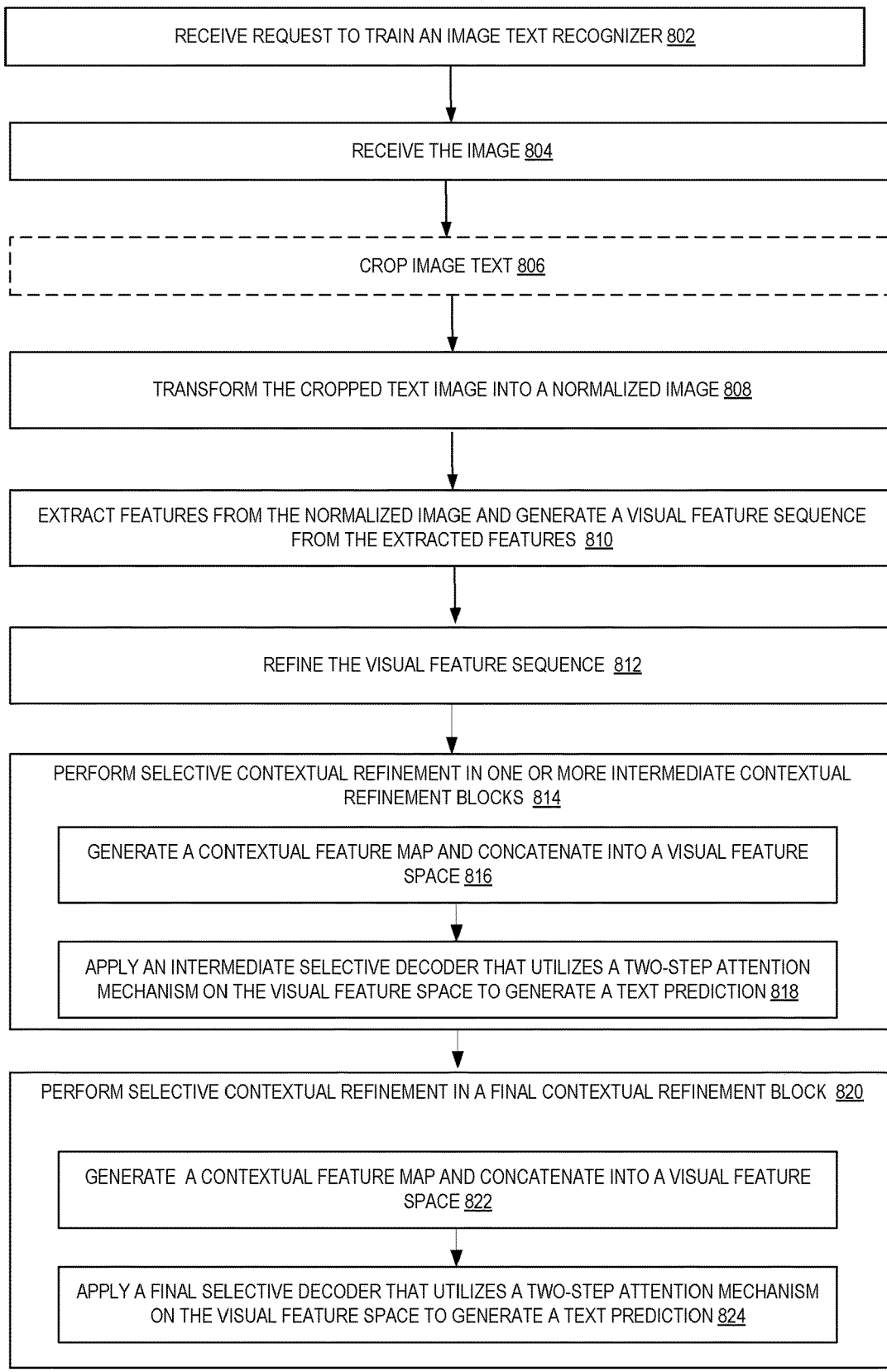
FIG. 8 is a flow diagram illustrating operations of a method for training an image text recognizer according to some embodiments.

FIG. 8 is a flow diagram illustrating operations of a method for training an image text recognizer according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed to generate the image text recognizer 200 of the other figures.

At 802, a request to train an image text recognizer is received. Depending the type of request, the request may include images to use for training, a proper subset (crop) of images to use for training, a location of an image to analyze, a location of a proper subset (crop) of an images to use for training, an indication of how results are to be provided, etc.

The image containing text is received at 804. In some embodiments, the image text is cropped at 806.

At 808, the (cropped) image is transformed into a normalized image. Details of how this transformation may occur have been detailed above.

Features are extracted from the normalized image and a visual feature sequence is generated from the extracted features at 810. In some embodiments, a CNN performs this extraction and generation.

In some embodiments, the visual feature sequence is refined at 812. Refinement details are discussed above.

Selective contextual refinement is performed on the (refined) visual feature sequence using one or more intermediate selective-contextual refinement blocks to generate a text prediction at 814. As detailed above, there may be one or more selective-contextual refinement blocks in the image text recognizer. Typically, more blocks equate to better result. As a part of the selective contextual refinement, a contextual feature map is generated and concatenated into a visual feature space with the (refined) visual feature sequence at 816. For example, contextual features are generated by a BiLSTM and then concatenated with the (refined) visual feature sequence.

A two-step attention mechanism on the visual feature space is performed in a selective decoder to generate a text prediction at 818.

Selective contextual refinement is performed on the (refined) visual feature sequence using one or more intermediate selective-contextual refinement blocks to generate a text prediction at 820. As detailed above, there may be one or more selective-contextual refinement blocks in the image text recognizer. Typically, more blocks equate to better result. As a part of the selective contextual refinement, a contextual feature map is generated and concatenated into a visual feature space with the (refined) visual feature sequence at 82. For example, contextual features are generated by a BiLSTM and then concatenated with the (refined) visual feature sequence.

A two-step attention mechanism on the visual feature space is performed in a selective decoder to generate a text prediction at 824.

Figure 9:
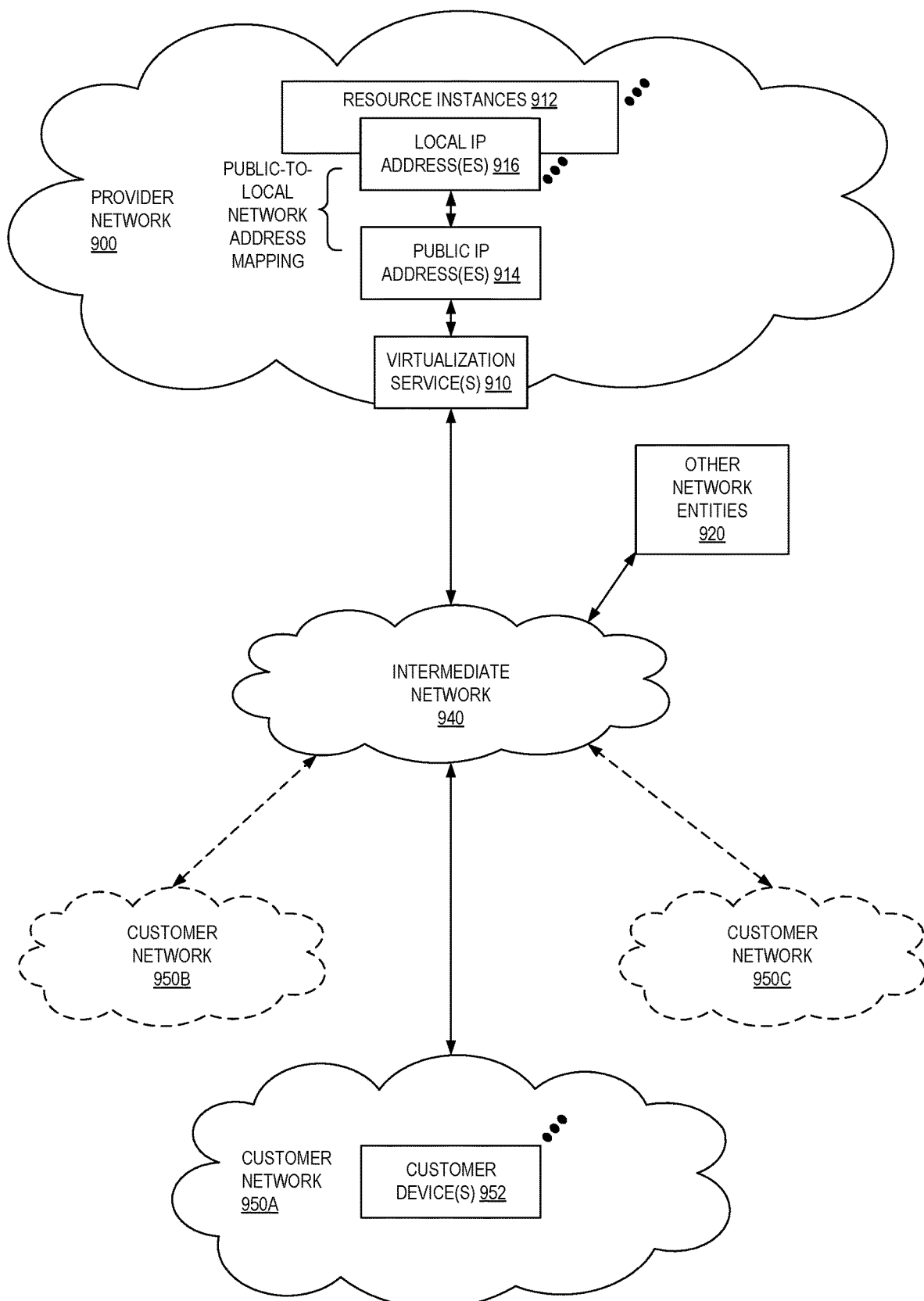
FIG. 9 illustrates an example provider network environment according to some embodiments.

FIG. 9 illustrates an example provider network (or "service provider system") environment according to some embodiments. A provider network 900 may provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 may be associated with the resource instances 912; the local IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that customers may obtain from the provider 900.

Conventionally, the provider network 900, via the virtualization services 910, may allow a customer of the service provider (e.g., a customer that operates one or more client networks 950A-950C including one or more customer device(s) 952) to dynamically associate at least some public IP addresses 914 assigned or allocated to the customer with particular resource instances 912 assigned to the customer. The provider network 900 may also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of customer network(s) 950A-950C may, for example, implement customer-specific applications and present the customer's applications on an intermediate network 940, such as the Internet. Other network entities 920 on the intermediate network 940 may then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 900; a customer may then assign their allocated public IP addresses to particular resource instances allocated to the customer. These public IP addresses may be referred to as customer public IP addresses, or simply customer IP addresses. Instead of being assigned by the provider network 900 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
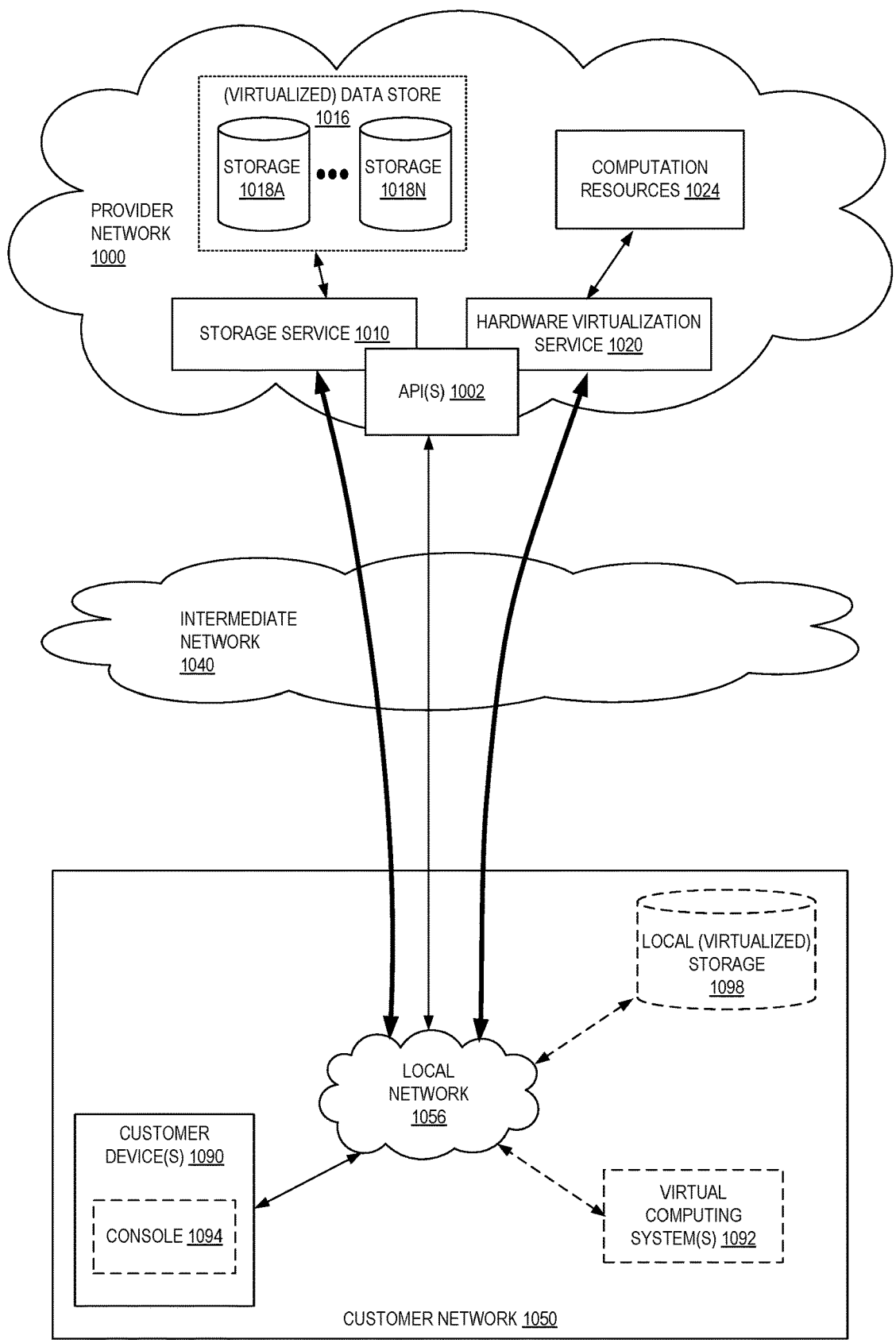
FIG. 10 is a block diagram of an example provider network that provides a storage service and a hardware virtualization service to customers according to some embodiments.

FIG. 10 is a block diagram of an example provider network that provides a storage service and a hardware virtualization service to customers, according to some embodiments. Hardware virtualization service 1020 provides multiple computation resources 1024 (e.g., VMs) to customers. The computation resources 1024 may, for example, be rented or leased to customers of the provider network 1000 (e.g., to a customer that implements customer network 1050). Each computation resource 1024 may be provided with one or more local IP addresses. Provider network 1000 may be configured to route packets from the local IP addresses of the computation resources 1024 to public Internet destinations, and from public Internet sources to the local IP addresses of computation resources 1024.

Provider network 1000 may provide a customer network 1050, for example coupled to intermediate network 1040 via local network 1056, the ability to implement virtual computing systems 1092 via hardware virtualization service 1020 coupled to intermediate network 1040 and to provider network 1000. In some embodiments, hardware virtualization service 1020 may provide one or more APIs 1002, for example a web services interface, via which a customer network 1050 may access functionality provided by the hardware virtualization service 1020, for example via a console 1094 (e.g., a web-based application, standalone application, mobile application, etc.). In some embodiments, at the provider network 1000, each virtual computing system 1092 at customer network 1050 may correspond to a computation resource 1024 that is leased, rented, or otherwise provided to customer network 1050.

From an instance of a virtual computing system 1092 and/or another customer device 1090 (e.g., via console 1094), the customer may access the functionality of storage service 1010, for example via one or more APIs 1002, to access data from and store data to storage resources 1018A-1018N of a virtual data store 1016 (e.g., a folder or "bucket", a virtualized volume, a database, etc.) provided by the provider network 1000. In some embodiments, a virtualized data store gateway (not shown) may be provided at the customer network 1050 that may locally cache at least some data, for example frequently-accessed or critical data, and that may communicate with storage service 1010 via one or more communications channels to upload new or modified data from a local cache so that the primary store of data (virtualized data store 1016) is maintained. In some embodiments, a user, via a virtual computing system 1092 and/or on another customer device 1090, may mount and access virtual data store 1016 volumes via storage service 1010 acting as a storage virtualization service, and these volumes may appear to the user as local (virtualized) storage 1098.

While not shown in FIG. 10, the virtualization service(s) may also be accessed from resource instances within the provider network 1000 via API(s) 1002. For example, a customer, appliance service provider, or other entity may access a virtualization service from within a respective virtual network on the provider network 1000 via an API 1002 to request allocation of one or more resource instances within the virtual network or within another virtual network.

Illustrative Systems

Figure 11:
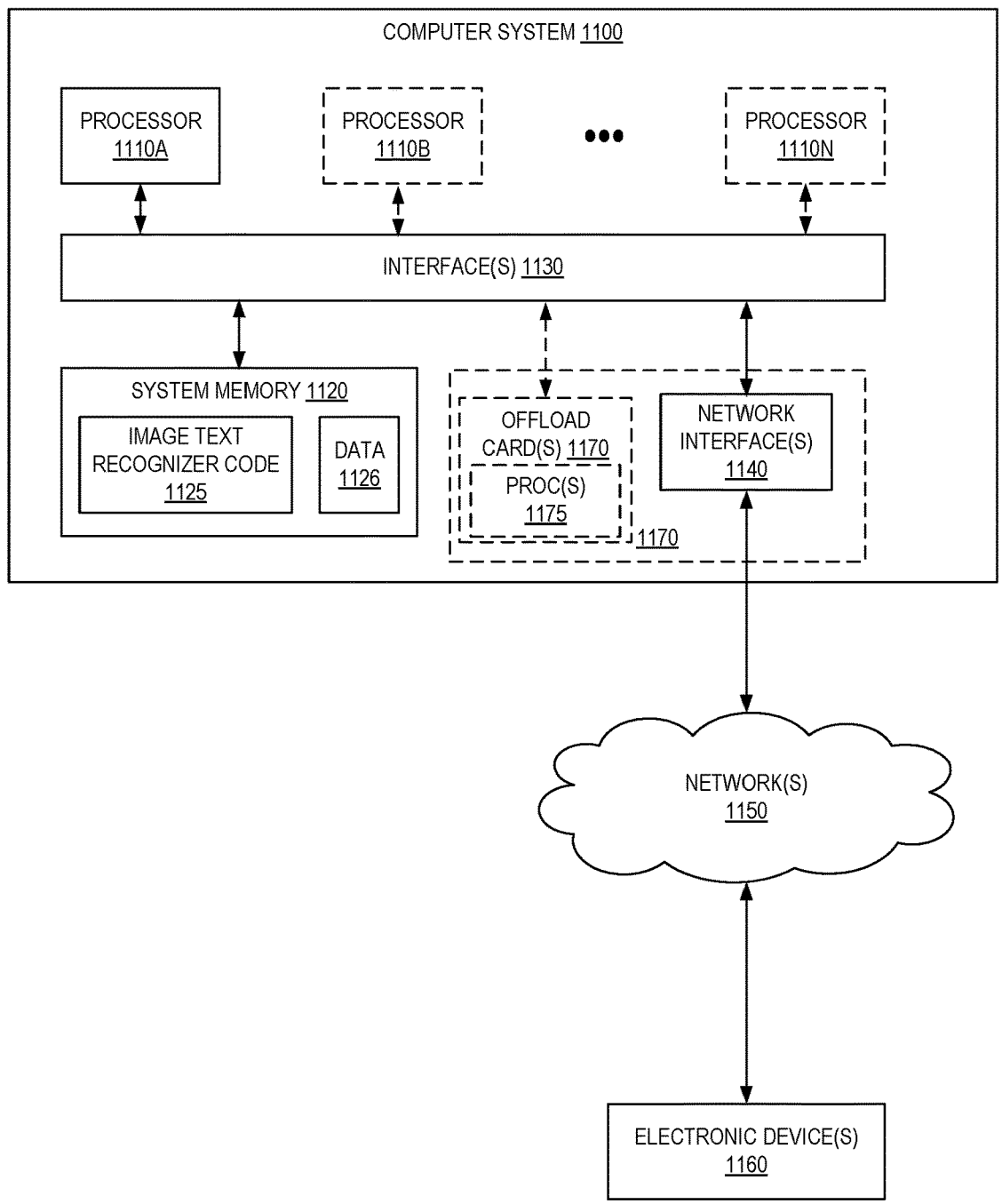
FIG. 11 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1120 as image text recognizer code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1150, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1100 includes one or more offload cards 1170 (including one or more processors 1175, and possibly including the one or more network interfaces 1140) that are connected using an I/O interface 1130 (e.g., a bus implementing a version of the Peripheral Component Interconnect Express (PCI-E) standard, or another interconnect such as a QuickPath interconnect (QPI) or UltraPath interconnect (UPI)). For example, in some embodiments the computer system 1100 may act as a host electronic device (e.g., operating as part of a hardware virtualization service) that hosts compute instances, and the one or more offload cards 1170 execute a virtualization manager that can manage compute instances that execute on the host electronic device. As an example, in some embodiments the offload card(s) 1170 can perform compute instance management operations such as pausing and/or un-pausing compute instances, launching and/or terminating compute instances, performing memory transfer/copying operations, etc. These management operations may, in some embodiments, be performed by the offload card(s) 1170 in coordination with a hypervisor (e.g., upon a request from a hypervisor) that is executed by the other processors 1110A-1110N of the computer system 1100. However, in some embodiments the virtualization manager implemented by the offload card(s) 1170 can accommodate requests from other entities (e.g., from compute instances themselves), and may not coordinate with (or service) any separate hypervisor.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a request to recognize text in an image;
   transforming the image into a normalized image;
   extracting features from the normalized image and generating a visual feature sequence from the extracted features;
   refining the visual feature sequence;
   performing selective contextual refinement at least one time to generate a text prediction by:
   generating a contextual feature map and concatenating the contextual feature map with the visual feature sequence into a visual feature space, and
   applying a selective decoder that utilizes a two-step attention on the visual feature space to generate a text prediction, wherein the two-step attention includes:
   obtaining an attention map from the visual feature space,
   performing an element-wise product between the attention map and the visual feature sequence to generate attentional features, and
   decoding the attentional features to generate the text prediction; and
   outputting the generated text prediction.

2. The computer-implemented method of claim 1, wherein the received image is a crop of a large image, the crop focusing on the text image.

3. The computer-implemented method of claim 1, wherein refining the visual feature sequence comprises classifying each feature of the visual feature sequence.

4. A computer-implemented method comprising:
   receiving a request to recognize text in an image;
   extracting features from the image and generating a visual feature sequence from the extracted features;
   performing selective contextual refinement at least one time to generate a text prediction by:
   generating a contextual feature map and combining the contextual feature map with the visual feature sequence into a visual feature space, and
   applying a selective decoder that utilizes a two-step attention on the visual feature space to generate a text prediction, wherein the two-step attention includes performing a 1-D self-attention computation to generate attentional features and decoding the attentional features to generate the text prediction; and
   outputting the generated text prediction.

5. The computer-implemented method of claim 4, wherein the received image is a crop of a large image, the crop focusing on the text image.

6. The computer-implemented method of claim 4, further comprising:
   using a machine learning model to crop the image before extracting features.

7. The computer-implemented method of claim 4, wherein the 1-D self-attention computation comprises:
   obtaining an attention map from the visual feature space; and
   performing an element-wise product between the visual feature sequence and the attention map to generate the attentional features.

8. The computer-implemented method of claim 4, wherein decoding the attentional features to generate the text prediction comprises using an attention decoder to compute a vector of attentional weights, combining the visual feature space into a vector, and feeding a recurrent cell of the attention decoder a combination of the vector and an embedding.

9. The computer-implemented method of claim 4, wherein the contextual feature map is generated using one or more bidirectional long short-term memory neural networks.

10. The computer-implemented method of claim 4, wherein the selective decoder was trained along with one or more selective decoders of a stack of selective-contextual refinement blocks.

11. The computer-implemented method of claim 4, further comprising:
transforming the image into a normalized image.

12. The computer-implemented method of claim 11, wherein transforming the image into a normalized image is performed using thin plate spline transformation.

13. The computer-implemented method of claim 4, wherein the features from the image are extracted using a convolutional neural network.

14. The computer-implemented method of claim 4, wherein the request includes an indication of a location of the image in a provider network.

15. A system comprising:
a first one or more electronic devices to store an image in a multi-tenant provider network; and
a second one or more electronic devices to implement an image text recognizing service in the multi-tenant provider network, the image text recognizing service including instructions that, upon execution, cause the image text recognizing service to:
receive a request to recognize text in a stored image,
extract features from the image and generating a visual feature sequence from the extracted features, and
perform selective contextual refinement at least one time to generate a text prediction by:
generating a contextual feature map and combining the contextual feature map with the visual feature sequence into a visual feature space, and
applying a selective decoder that utilizes a two-step attention on the visual feature space to generate a text prediction, wherein the two-step attention includes performing a 1-D self-attention computation to generate attentional features and decoding the attentional features to generate the text prediction; and
output the generated text prediction.

16. The system of claim 15, wherein image text recognizing service is further to transform the image into a normalized image.

17. The system of claim 15, wherein transforming the image into a normalized image is performed using thin plate spline transformation.

18. The system of claim 15, wherein the features from the image are extracted using a convolutional neural network.

19. The system of claim 15, wherein the request includes an indication of a location of the image in a provider network.

20. The system of claim 15, wherein the 1-D self-attention computation comprises:
obtaining an attention map from the visual feature space; and
performing an element-wise product between the visual feature sequence and the attention map to generate the attentional features.

\* \* \* \* \*